US008868839B1

(12) United States Patent
Banerjee et al.

(10) Patent No.: US 8,868,839 B1
(45) Date of Patent: Oct. 21, 2014

(54) SYSTEMS AND METHODS FOR CACHING DATA BLOCKS ASSOCIATED WITH FREQUENTLY ACCESSED FILES

(75) Inventors: Anindya Banerjee, Wakad (IN); Amit Jambure, Solapur (IN); Kedar Patwardhan, Pune (IN); Niranjan Pendharkar, Pune (IN)

(73) Assignee: Symantec Corporation, Mountain View, CA (US)

( * ) Notice: Subject to any disclaimer, the term of this patent is extended or adjusted under 35 U.S.C. 154(b) by 475 days.

(21) Appl. No.: 13/081,706

(22) Filed: Apr. 7, 2011

(51) Int. Cl.
*G06F 12/00* (2006.01)

(52) U.S. Cl.
USPC .......................................... 711/133; 711/118

(58) Field of Classification Search
CPC .............................. G06F 12/0866; G06F 12/12
See application file for complete search history.

(56) References Cited

U.S. PATENT DOCUMENTS

| 5,761,724 | A | * | 6/1998 | Jhon et al. ...................... 711/144 |
| 6,157,942 | A | * | 12/2000 | Chu et al. ...................... 709/203 |
| 2002/0091902 | A1 | * | 7/2002 | Hirofuji ......................... 711/133 |
| 2003/0115251 | A1 | * | 6/2003 | Fredrickson et al. .......... 709/201 |
| 2005/0060496 | A1 | * | 3/2005 | Krissell et al. ................. 711/133 |
| 2006/0026229 | A1 | * | 2/2006 | Ari et al. ......................... 709/203 |
| 2009/0100224 | A1 | * | 4/2009 | Wang .............................. 711/118 |
| 2009/0204606 | A1 | * | 8/2009 | Osada ................................. 707/5 |
| 2010/0077013 | A1 | * | 3/2010 | Clements et al. ............... 707/822 |
| 2012/0144109 | A1 | * | 6/2012 | Balakrishnan et al. ........ 711/113 |

* cited by examiner

*Primary Examiner* — Charles Rones
*Assistant Examiner* — Tian-Pong Chang
(74) *Attorney, Agent, or Firm* — ALG Intellectual Property, LLC

(57) ABSTRACT

A computer-implemented method may include identifying a file that includes one or more data blocks stored within a storage device. The computer-implemented method may also include determining that the file has been accessed more frequently than one or more other files stored within the storage device and then tracking the number of times that at least one data block associated with the file is accessed in the storage device. The computer-implemented method may further include determining that the number of times that the data block associated with the file has been accessed in the storage device is above a predetermined threshold. In addition, the computer-implemented method may include caching the data block associated with the file in a caching mechanism to decrease the amount of time required to access the data block. Various other methods, systems, and computer-readable media are also disclosed.

20 Claims, 6 Drawing Sheets

SYSTEMS AND METHODS FOR CACHING DATA BLOCKS ASSOCIATED WITH FREQUENTLY ACCESSED FILES

BACKGROUND

Computing devices often cache data in a caching mechanism to facilitate fast, efficient access to the data. For example, a computing device may attempt to access data stored within a mass storage device (such as a hard disk drive) that is unable to facilitate access to the data as quickly or efficiently as a caching mechanism. In this example, the computing device may copy the data from the mass storage device to a caching mechanism (such as a solid-state drive caching system) in order to increase the speed at which the data may be accessed.

However, since caching mechanisms generally provide less storage capacity than mass storage devices, a caching mechanism may be unable to store all of the same data stored within a mass storage device. As a result, in order to gain certain speed and efficiency advantages from the caching mechanism, a computing device may need to copy only the most frequently accessed data from the mass storage device to the caching mechanism. By caching only the most frequently accessed data, the computing device may enable the most frequently accessed data to be accessed in a fast, efficient manner.

In at least one traditional technique, a computing device may identify the data most frequently accessed in a mass storage device by tracking the number of times that each block of data stored within the mass storage device is accessed. For example, a computing device may maintain one or more data structures that store statistics (e.g., read-write statistics) for each block of data stored within a mass storage device. Unfortunately, such data structures may become very large and cumbersome, potentially leading to slower processing times and decreased availability of computing resources. What is needed, therefore, is a more efficient mechanism for identifying and caching blocks of data that are frequently accessed by computing devices.

SUMMARY

As will be described in greater detail below, the instant disclosure generally relates to systems and methods for caching data blocks associated with frequently accessed files. In one embodiment, a method for caching data blocks associated with frequently accessed files may include identifying a file that includes one or more data blocks stored within a storage device. For example, an identification module may identify a file that includes various data blocks stored within a hard disk drive.

In some embodiments, a tracking module may determine that the file has been accessed more frequently than one or more other files stored within the storage device. In one example, the identification module may identify a request to access a file. The identification module may also identify an indicator provided with the request that indicates that the file has been accessed more frequently than other files stored within the storage device. In this example, the identification module may then send, to the tracking module, a notification indicating that the file has been accessed more frequently than the other files.

In another example, the tracking module may track the number of times that the file is accessed in the storage device and the number of times that the other files are accessed in the storage device. For example, the tracking module may track the number of read and write operations performed on the file and the other files in the storage device. In one example, the tracking module may maintain, within a data structure (such as an inode) associated with the file, a counter that tracks the number of read and write operations performed on the file in the storage device. The tracking module may compare the number of read and write operations performed on the file with the number of read and write operations performed on the other files. The tracking module may then determine, based on this comparison, that the file has been accessed more frequently than the other files stored within the storage device.

Additionally or alternatively, the tracking module may compute a read-write ratio for the file based on the number of read and write operations performed on the file in the storage device. The tracking module may also compute other read-write ratios for the other files based on the number of read and write operations performed on the other files in the storage device. In one example, the tracking module may compare the read-write ratio for the file with the other read-write ratios for the other files. In this example, the tracking module may then determine, based on this comparison, that the read-write ratio for the file is higher than the other read-write ratios for the other files stored within the storage device.

In response to determining that the file has been accessed more frequently than one or more other files (or that the read-write ratio for the file is higher than the other read-write ratios for the other files), the tracking module may begin to track the number of times that at least one data block associated with the file is accessed in the storage device. For example, the tracking module may begin to track the number of read and write operations that are performed on the data block associated with the file in the storage device. In one example, the tracking module may maintain, within a data structure associated with the data block, a counter that tracks the number of read and write operations performed on the data block in the storage device.

In some embodiments, the tracking module may determine that the number of times that the data block has been accessed in the storage device is above a predetermined threshold. For example, the tracking module may determine that the number of read operations performed on the data block associated with the file is above a predetermined threshold. In addition, if the number of times that the data block associated with the file has been accessed in the storage device is above the predetermined threshold, a caching module may cache the data block in a caching mechanism (such as a solid-state drive caching system) to decrease the amount of time required to access the data block.

In one example, the identification module may identify a request to perform a write operation on the file and then determine that the write operation is configured to modify one or more data blocks associated with the file. The identification module may also identify an indicator provided with the request that indicates that one or more data blocks associated with the file have been cached in the caching mechanism. In response, the caching module may satisfy the request, at least in part, by causing the write operation to be performed on the data block stored within the storage device and then invalidating the data block cached in the caching mechanism to ensure that read operations are performed only on the modified data block stored within the storage device. For example, the caching module may mark the data block cached in the caching mechanism to be replaced by another data block or simply remove the data block from the caching mechanism.

In another example, the identification module may identify a request initiated by a file system to perform a write operation on another file and then determine that the write operation is configured to modify only data blocks stored within the storage device. For example, the identification module may identify an indicator provided with the request that indicates that no data block associated with the other file has been cached in the caching mechanism. In response, the caching module may satisfy the request, at least in part, by causing the write operation to be performed on one or more data blocks stored within the storage device without attempting to invalidate any data blocks cached in the caching mechanism.

In some examples, the identification module may also identify a request initiated by a file system to perform a read operation on the file. The identification module may then identify an indicator provided with the request that indicates that at least one data block associated with the file has been cached in the caching mechanism. In response, the caching module may satisfy the request, at least in part, by retrieving the data block associated with the file from the caching mechanism rather than the storage device.

In some examples, the caching module may send a notification to the file system to notify the file system that one or more data blocks associated with the file have been cached in the caching mechanism. This notification may prompt the file system to provide, with requests to perform a read or write operation on the file, an indicator that indicates that one or more data blocks associated with the file have been cached in the caching mechanism.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
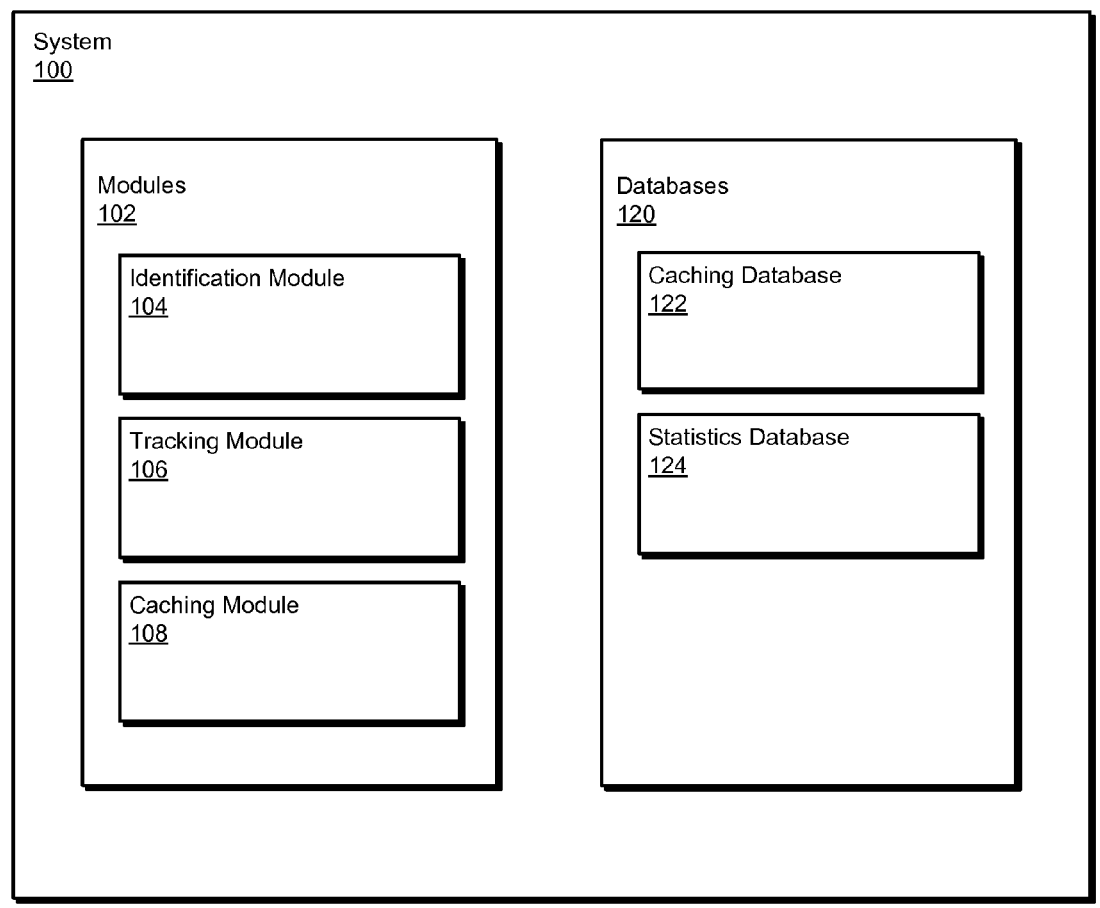
FIG. 1 is a block diagram of an exemplary system for caching data blocks associated with frequently accessed files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for caching data blocks associated with frequently accessed files. For example, rather than tracking the number of times that each data block stored within a storage device (such as a hard disk drive) is accessed, a computing device may track only the number of times that data blocks associated with frequently accessed files (or "hot" files) are accessed in the storage device. By tracking only the number of times that data blocks associated with frequently accessed files are accessed in the storage device, the computing device may increase availability of computing resources and decrease the amount of processing time required to update read-write statistics for the data blocks. In other embodiments, in addition to and/or instead of tracking accesses to data blocks associated with hot files, systems disclosed herein may track accesses to one or more other data blocks.

In one example, while tracking the number of times that data blocks associated with frequently accessed files are accessed, a computing device may determine that the number of times that at least one data block associated with a frequently accessed file has been accessed is above a predetermined threshold. In this example, the computing device may then cache the data block associated with the file in a caching mechanism (such as a solid-state drive caching system) to decrease the amount of time required to access the data block.

Figure 2:
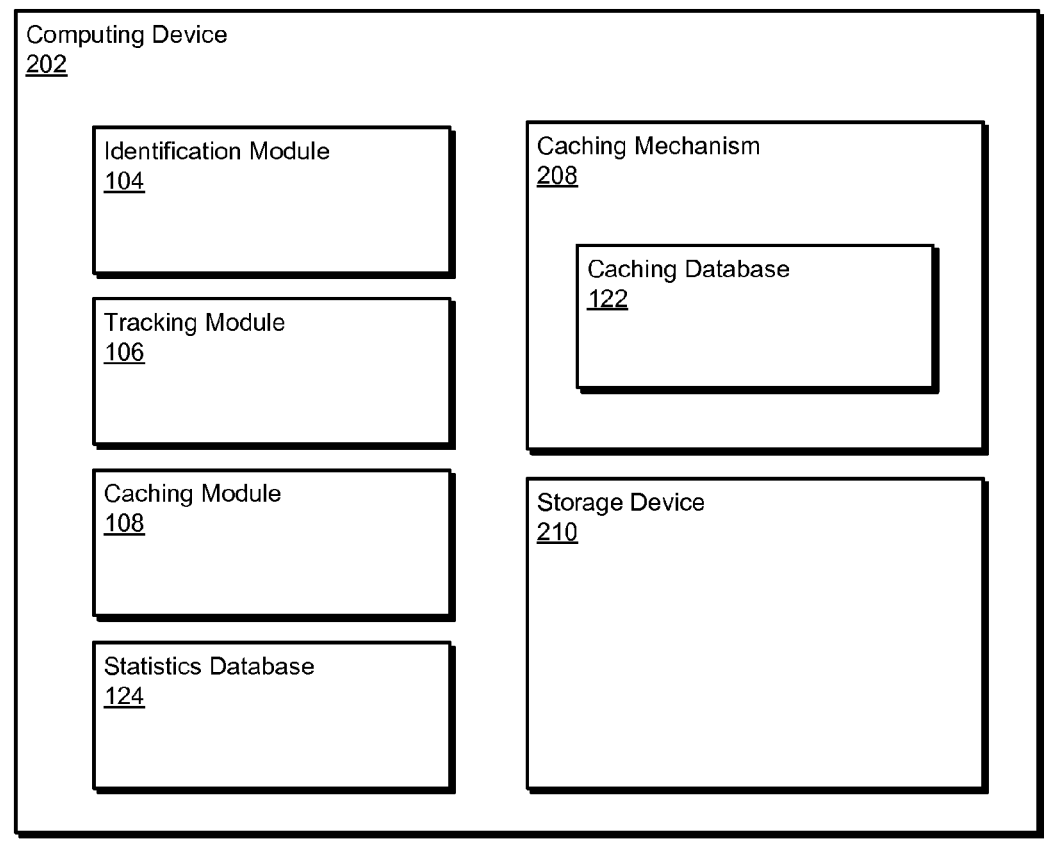
FIG. 2 is a block diagram of another exemplary system for caching data blocks associated with frequently accessed files.

The following will provide, with reference to FIGS. 1-2, detailed descriptions of exemplary systems for caching data blocks associated with frequently accessed files. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for caching data blocks associated with frequently accessed files. As illustrated in this figure, exemplary system 100 may include one or more modules 102 for performing one or more tasks. For example, and as will be explained in greater detail below, exemplary system 100 may include an identification module 104 programmed to identify a file that includes one or more data blocks stored within a storage device.

In addition, exemplary system 100 may include a tracking module 106 programmed to determine that the file has been accessed more frequently than one or more than one or more other files stored within the storage device. Tracking module 106 may also be programmed to track the number of times that at least one data block associated with the file is accessed in the storage device. Tracking module 106 may be further programmed to determine that the number of times that the data block associated with the file has been accessed in the storage device is above a predetermined threshold.

As will be described in greater detail below, exemplary system 100 may also include a caching module 108 programmed to cache the data block associated with the file in a caching mechanism to decrease the amount of time required to access the data block. Although illustrated as separate elements, one or more of modules 102 in FIG. 1 may represent portions of a single module or application. Moreover, one or more of modules 102 may represent portions of a built-in component (e.g., a file system) or function of an operating system.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as computing device 202 in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a caching database 122 configured to store data blocks (e.g., data blocks associated with files that have been frequently accessed in storage device 210). Exemplary system 100 may also include a statistics database 124 configured to store statistics (e.g., read-write statistics) for data blocks and/or files stored within storage device 210 and/or caching mechanism 208.

Databases 120 in FIG. 1 may represent a portion of one or more computing devices. For example, databases 120 may represent a portion of computing system 510 in FIG. 5 and/or portions of exemplary network architecture 600 in FIG. 6. Alternatively, databases 120 in FIG. 1 may represent one or more physically separate devices capable of being accessed by a computing device, such as computing device 202 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of exemplary system 200 in FIG. 2. As shown in FIG. 2, system 200 may include a computing device 202 in communication with a caching mechanism 208 and a storage device 210. In some examples, as illustrated in FIG. 2, caching mechanism 208 and/or storage device 210 may represent internal devices or components of computing device 202. In other examples, although not illustrated in FIG. 2, caching mechanism 208 and/or storage device 210 may represent separate, individual devices that communicate with computing device 202 via wireless or wired connections.

In one embodiment, and as will be described in greater detail below, computing device 202 may be programmed by identification module 104 to identify a file that includes one or more data blocks stored within storage device 210. Computing device 202 may also be programmed by tracking module 106 to determine that the file has been accessed more frequently than one or more other files stored within storage device 210. Computing device 202 may be further programmed by tracking module 106 to track the number of times that at least one data block associated with the file is accessed in storage device 210 and then determine that the number of times that the data block has been accessed is above a predetermined threshold. In addition, computing device 202 may be programmed by caching module 108 to cache the data associated with the file in caching mechanism 208 to decrease the amount of time required to access the data block.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Storage device 210 generally represents any type or form of storage device capable of storing data blocks associated with files. Examples of storage device 210 include, without limitation, hard disk drives, solid-state drives, magnetic tape drives, optical disc drives, magneto-optical disc drives, deduplication storage systems, random-access-memory devices, or any other type of volatile or non-volatile storage devices.

Caching mechanism 208 generally represents any type or form of storage mechanism or device capable of caching data blocks associated with files. Caching mechanism 208 may represent a storage mechanism or device capable of facilitating access to stored data more quickly and/or efficiently than storage device 210. Caching mechanism 208 may also represent a software component or database configured as a portion of another storage device.

In one example, caching mechanism 208 may reside (with respect to the computer architecture of computing device 202) between a file system and a device driver for storage device 210. Examples of caching mechanism 208 include, without limitation, all or a portion of solid-state drives, random-access-memory devices, central-processing-unit ("CPU") caches, or any other suitable type of caching mechanisms.

Figure 3:
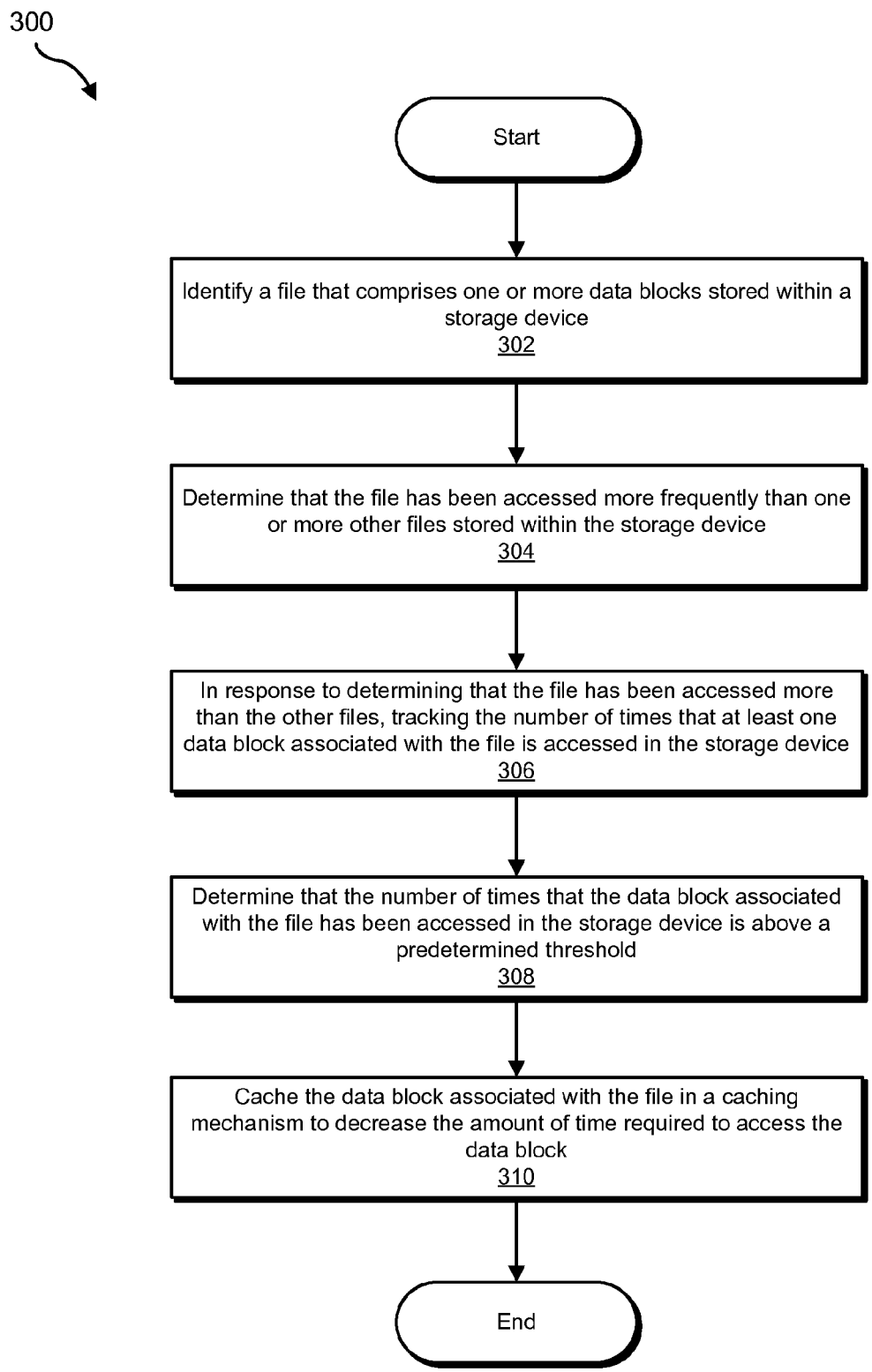
FIG. 3 is a flow diagram of an exemplary method for caching data blocks associated with frequently accessed files.

FIG. 3 is a flow diagram of an exemplary computer-implemented method 300 for caching data blocks associated with frequently accessed files. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated at step 302 in FIG. 3, the various systems described herein may identify a file that includes one or more data blocks stored within a storage device. For example, identification module 104 may, as part of computing device 202, identify a file that includes one or more data blocks stored within storage device 210. Each data block may represent at least a portion of the content of the file stored within storage device 210.

The systems described herein may perform step 302 in a variety of ways. In one example, identification module 104 may identify the file as the file is initially stored within storage device 210. In another example, identification module 104 may identify the file upon receiving a request (e.g., request 400(1) in FIG. 4) from a file system to access the file.

As illustrated at step 304 in FIG. 3, the various systems described herein may determine that the file has been accessed more frequently than one or more other files stored within the storage device. For example, tracking module 106 may, as part of computing device 202, determine that the file has been accessed more frequently than one or more other files stored within storage device 210. In this example, tracking module 106 may classify the file as a frequently accessed file upon determining that the file has been accessed more frequently than a particular percentage (e.g., seventy-five percent) of the files stored within storage device 210.

The systems described herein may perform step 304 in a variety of ways. In one example, identification module 104 may identify a request initiated by a file system (e.g., a file system installed on computing device 202) to access the file stored within storage device 210. In this example, identification module 104 may also identify an indicator provided with the request that indicates that the file has been accessed more frequently than one or more other files stored within storage device 210. Upon identifying the indicator, identification module 104 may send, to tracking module 106, a notification that indicates that the file has been accessed more frequently than one or more other files stored within storage device 210. Tracking module 106 may receive the notification and then determine, based on the notification, that the file has been accessed more frequently than one or more other files stored within storage device 210.

Figure 4:
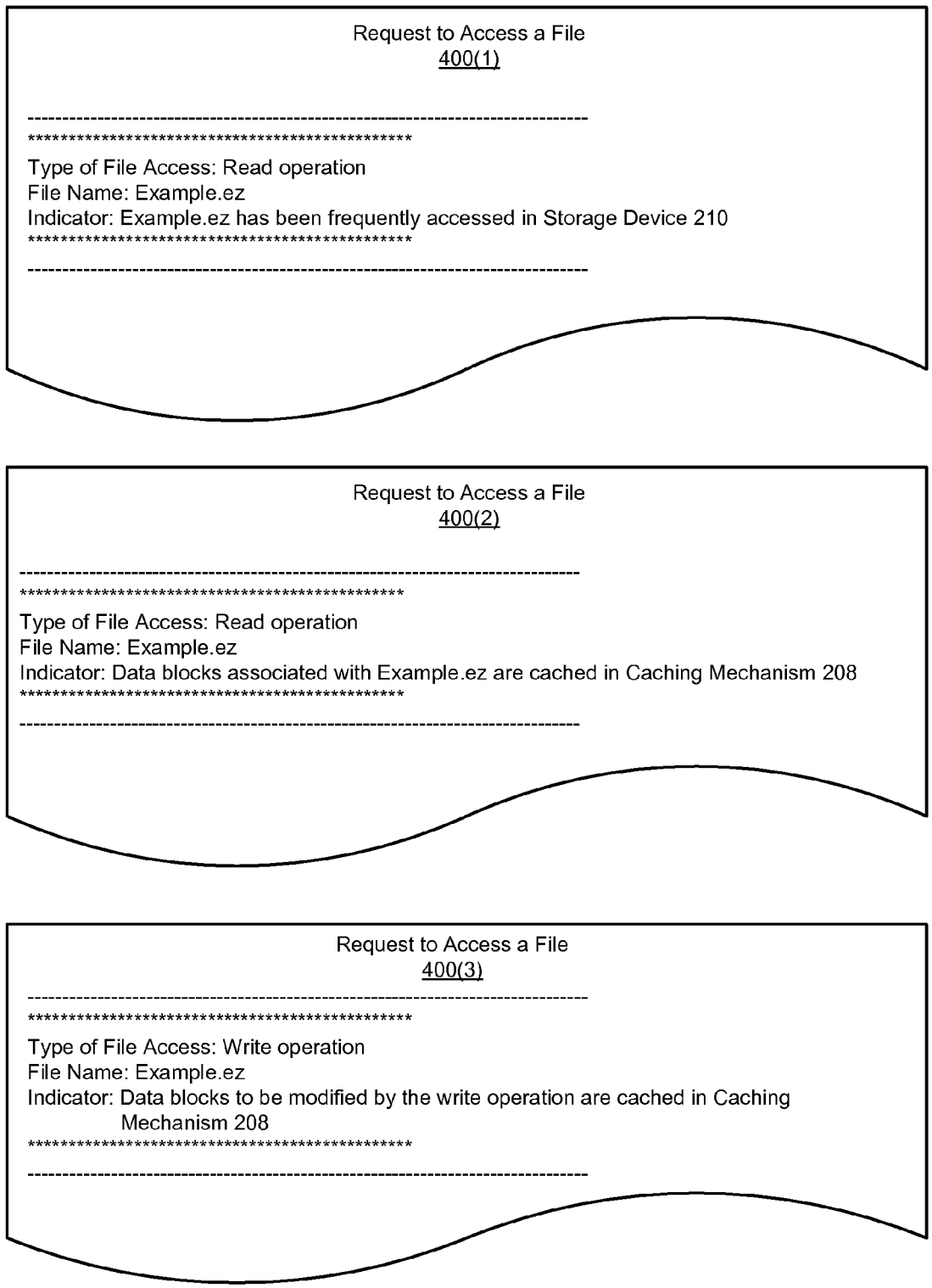
FIG. 4 is an illustration of exemplary requests to access a file.

As illustrated in FIG. 4, exemplary requests 400(1)-(3) to access a file may include information that identifies the type of file access requested (e.g., in request 400(1), "Read operation"), the name of the file to be accessed (e.g., in request 400(1), "Example.ez"), and an indicator that provides additional information regarding the file to be accessed (e.g., in request 400(1), "Example.ez has been frequently accessed in Storage Device 210"). In some examples, the indicator may prompt one or more of modules 102 to perform a particular action. For example, the indicator identified in request 400(1) may prompt tracking module 106 to track the number of times that at least one data block associated with the file is accessed in storage device 210.

Although requests 400(1)-(3) in FIG. 4 include indicators that provide a description of a trigger that effectively causes one or more of modules 102 to perform a particular action, a request to access a file may additionally or alternatively include an indicator that simply identifies the particular action to be performed by one or more of modules 102. For example, rather than indicating that the file has been frequently accessed in storage device 210, the indicator may simply read "TRACK_FILES," thereby prompting tracking module 106 to track data blocks associated with the file identified in the request.

In another example, tracking module 106 may track the number of times that the file is accessed in storage device 210 and also track the number of times that one or more other files are accessed in storage device 210. For example, identification module 104 may identify one or more requests to access the file and/or the other files in storage device 210. For each request identified by identification module 104 to access either the file or one of the other files, identification module 104 may send, to tracking module 106, a notification indicating that a request to access the file or one of the other files has been identified. Tracking module 106 may receive such notifications and then track the number of times that the file and the other files are accessed in storage device 210 based on the number of notifications received from identification module 104.

In this example, while tracking the number of times that the file and the other files are accessed in storage device 210, tracking module 106 may compare the number of times that the file has been accessed in storage device 210 with the number of times that the other files have been accessed in storage device 210. Tracking module 106 may then determine, based on this comparison, that the file has been accessed more frequently than the other files stored within storage device 210.

In one embodiment, tracking module 106 may maintain, for each file stored within storage device 210, a counter that tracks the number of times that a particular file is accessed in storage device 210. Tracking module 106 may maintain each counter in a data structure (e.g., an inode) that stores information about a particular file within statistics database 124. Each counter may be configured to generate access statistics (e.g., read-write statistics) that identify the number of times that a particular file is accessed in storage device 210. Tracking module 106 may store such access statistics for each file in the corresponding data structure within statistics database 124.

In some examples, tracking module 106 may compute a read-write ratio for the file based on the number of read and write operations performed on the file in storage device 210. Tracking module 106 may also compute one or more other read-write ratios for one or more other files based on the number of read and write operations performed on the other files in storage device 210. For example, tracking module 106 may compute a read-write ratio of 5:1 for a particular file, indicating that five read operations have been performed on the file for every write operation performed on the file.

In such examples, tracking module 106 may then compare the read-write ratio for the file with the other read-write ratios for the other files. Tracking module 106 may also determine, based on this comparison, that the read-write ratio for the file is higher than the other read-write ratios for the other files. Upon determining that the read-write ratio for the file is higher than the other read-write ratios for the other files, tracking module 106 may treat the file as though it has been accessed more frequently than the other files.

As illustrated at step 306 in FIG. 3, the various systems described herein may track the number of times that at least one data block associated with the file is accessed in the storage device. For example, tracking module 106 may, as part of computing device 202, track the number of times that at least one data block associated with the file is accessed in storage device 210. In this example, tracking module 106 may begin to track the number of times that the data block is accessed in response to determining that the file that includes the data block has been accessed more frequently than one or more other files stored within storage device 210.

The systems described herein may perform step 306 in a variety of ways. In some examples, identification module 104 may identify one or more requests to access the data block associated with the file. In one example, identification module 104 may identify one or more requests to perform a read operation that is configured to read the data block associated with the file. In a similar example, identification module 104 may identify one or more requests to perform a write operation that is configured to modify the data block associated with the file.

In another example, identification module 104 may identify one or more requests to access a different file that references the same data block associated with the file. For example, the storage device that stores the data block associated with the file may implement data deduplication by enabling multiple files to reference a single data block in order to remove any instances of redundancy among the data blocks. In this example, identification module 104 may identify one or more requests to access a different file that references the data block even though the data block was initially stored within the storage device as part of the file identified in step 302.

For each request identified by identification module 104 to access the data block associated with the file, identification module 104 may send, to tracking module 106, a notification indicating that a request to access the data block has been identified. Tracking module 106 may receive such notifications and then track the number of times that the data block is accessed in storage device 210 based on the number of notifications received from identification module 104.

In one embodiment, tracking module 106 may maintain a counter that tracks the number of times that the data block is accessed in storage device 210. Tracking module 106 may maintain this counter in a data structure stored within statistics database 124. This counter may be configured to generate access statistics (e.g., read-write statistics) that identify the number of times that the data block associated with the file is accessed in storage device 210. Tracking module 106 may then store the access statistics for the data block in the data structure within statistics database 124.

As illustrated at step 308 in FIG. 3, the various systems described herein may determine that the number of times that the data block associated with the file has been accessed in the storage device is above a predetermined threshold. For example, tracking module 106 may, as part of computing device 202, determine that the number of times that the data block has been accessed (e.g., the number of read operations that have been performed on the data block) in storage device 210 is above a predetermined threshold. As will be described in greater detail below, this predetermined threshold may identify the number of times that a frequently accessed file may be accessed in storage device 210 prior to being cached in caching mechanism 208.

The systems described herein may perform step 308 in a variety of ways. In one example, tracking module 106 may compare the number of times that the data block has been accessed with the predetermined threshold. In another example, identification module 104 may identify a request initiated by a file system (e.g., a file system installed on computing device 202) to access a file stored within storage device 210. In this example, identification module 104 may then identify an indicator provided with the request that indicates that the number of times that the data block has been accessed in storage device 210 is above a predetermined threshold.

Upon identifying the indicator, identification module 104 may send, to tracking module 106, a notification that indicates that the number of times that the data block has been accessed is above the predetermined threshold. Tracking module 106 may receive the notification and then determine, based on the notification, that the number of times that the data block has been accessed in storage device 210 is above a predetermined threshold.

In some embodiments, the predetermined threshold may be a relative threshold that indicates a data block is being accessed more frequently than one or more other data blocks. In such embodiments, tracking module 106 may use any of the processes described in connection with step 304 (i.e., for determining that a file has been accessed more frequently than one or more other files) to determine that a data block is accessed more frequently than one or more other data blocks.

As illustrated at step 310 in FIG. 3, the various systems described herein may cache the data block associated with the file in a caching mechanism to decrease the amount of time required to access the data block. For example, caching module 108 may, as part of computing device 202, cache the data block associated with the file within caching database 122 located in caching mechanism 208. By caching the data block associated with the file in caching mechanism 208, caching module 108 may enable the data block to be accessed faster and more efficiently than the data block may be accessed in storage device 210.

The systems described herein may perform step 310 in a variety of ways. For example, caching module 108 may retrieve the data block associated with the file from storage device 210. In this example, upon retrieving the data block associated with the file from storage device 210, caching module 108 may copy the data block to caching database 122 located in caching mechanism 208. Upon completion of step 310, exemplary method 300 in FIG. 3 may terminate.

Although not illustrated in FIG. 3, an exemplary method for caching data blocks associated with frequently accessed files may include one or more additional steps. For example, in some embodiments, identification module 104 may identify a request 400(3) initiated by a file system (e.g., a file system installed on computing device 202) to perform a write operation on the file that includes the data block cached in caching mechanism 208. In this example, caching module 108 may analyze the indicator identified in request 400(3) and then determine, based on the analysis of the indicator, that the write operation is configured to modify the data block associated with the file.

In response to determining that the write operation is configured to modify the data block, caching module 108 may cause the write operation to be performed on the data block stored within storage device 210 rather than on the data block cached in caching mechanism 208. For example, caching module 108 may pass the write operation to storage device 210 even though at least one data block to be modified by the write operation is cached in caching mechanism 208. Caching module 108 may then invalidate the data block cached in caching mechanism 208 (if the data block has been cached) to ensure that read operations performed at a future time are performed only on the most up-to-date data block (i.e., the modified data block stored in storage device 210).

In one embodiment, caching module 108 may invalidate the data block cached in caching mechanism 208 by marking the data block to be replaced by another data block. In another embodiment, caching module 108 may invalidate the data block by removing the data block associated with the file from caching mechanism 208.

In another example, identification module 104 may identify a request initiated by a file system to perform a write operation on a file that includes at least one data block stored within storage device 210. In this example, identification module 104 may also identify an indicator provided with the request that indicates that the data block associated with the file has not been cached in caching mechanism 208. In response, caching module 108 may satisfy the request, at least in part, by causing the write operation to be performed on the data block stored within storage device 210 without attempting to invalidate any data blocks cached in the caching mechanism 208.

In one example, identification module 104 may identify a request 400(2) initiated by a file system (e.g., a file system installed on computing device 202) to perform a read operation on the file. In this example, identification module 104 may also identify an indicator provided with the request that indicates that at least one data block associated with the file has been cached in caching mechanism 208. Caching module 108 may then satisfy the request identified by identification module 104, at least in part, by retrieving the data block associated with the file from caching mechanism 208 (if the data block has been cached).

In one example, caching module 108 may send a notification to the file system to notify the file system that one or more data blocks associated with the file have been cached in caching mechanism 208. This notification may prompt the file system to provide, with requests to perform a read or write operation on the file, an indicator that indicates that one or more data blocks associated with the file have been cached in caching mechanism 208. For example, caching module 108 may send, to the file system, a notification that prompts the file system to set a flag (such as "HAS_BLOCKS_ON_SSD") in a data structure that stores information about the file within statistics database 124. In this example, the flag may indicate that at least one data block associated with the file has been cached in caching mechanism 208. Prior to issuing any requests to perform a read or write operation on the file, the file system may analyze the data structure that stores information about the file to determine whether at least one data block associated with the file has been cached in caching mechanism 208 (by, e.g., checking the flag).

Figure 5:
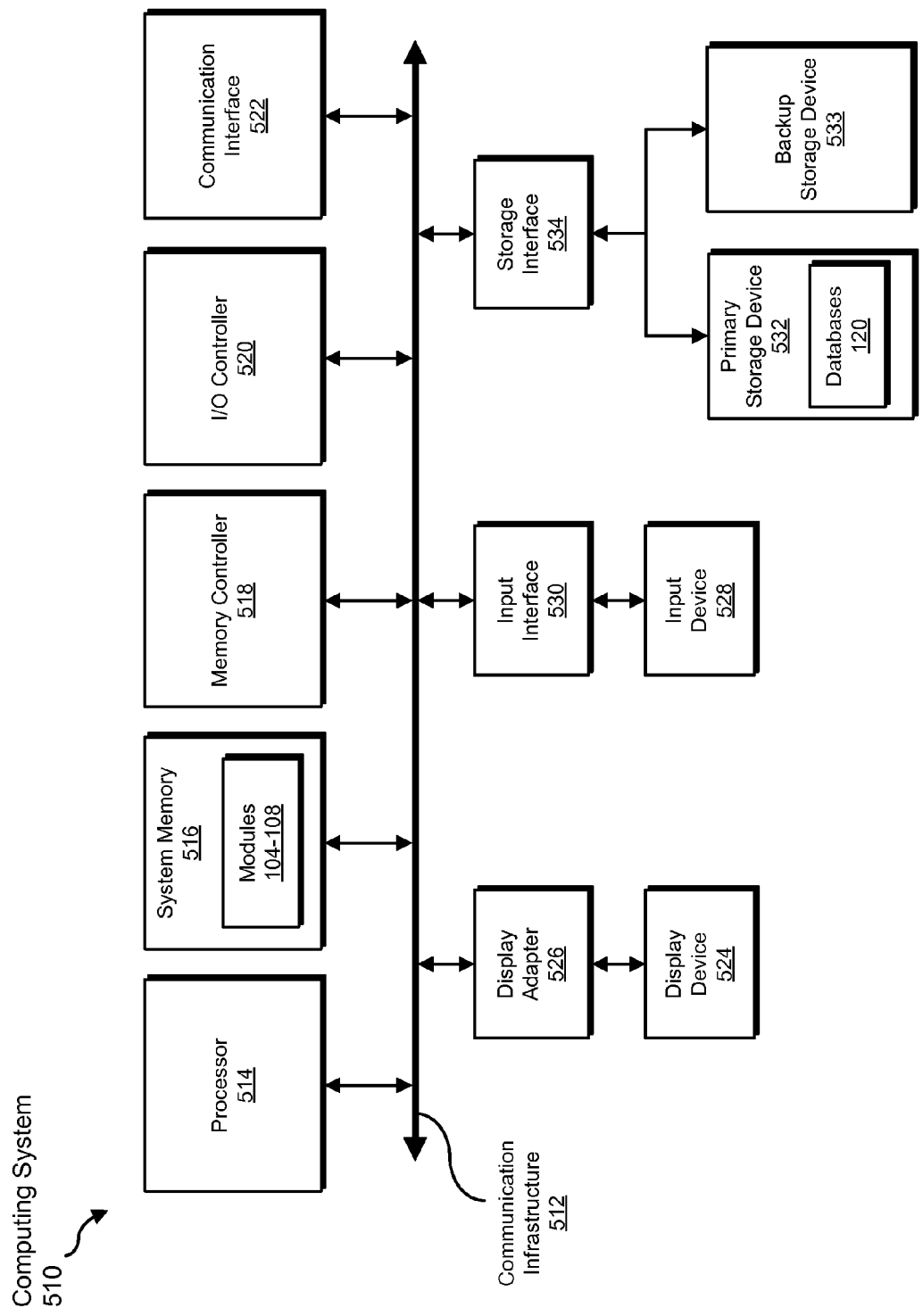
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, determining, tracking, caching, comparing, computing, maintaining, causing, invalidating, marking, removing, satisfying, retrieving, and sending steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, determining, tracking, caching, comparing, computing, maintaining, causing, invalidating, marking, removing, satisfying, retrieving, and sending.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, determining, tracking, caching, comparing, computing, maintaining, causing, invalidating, marking, removing, satisfying, retrieving, and sending steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, determining, tracking, caching, comparing, computing, maintaining, causing, invalidating, marking, removing, satisfying, retrieving, and sending steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, determining, tracking, caching, comparing, computing, maintaining, causing, invalidating, marking, removing, satisfying, retrieving, and sending steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, databases 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, determining, tracking, caching, comparing, computing, maintaining, causing, invalidating, marking, removing, satisfying, retrieving, and sending steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
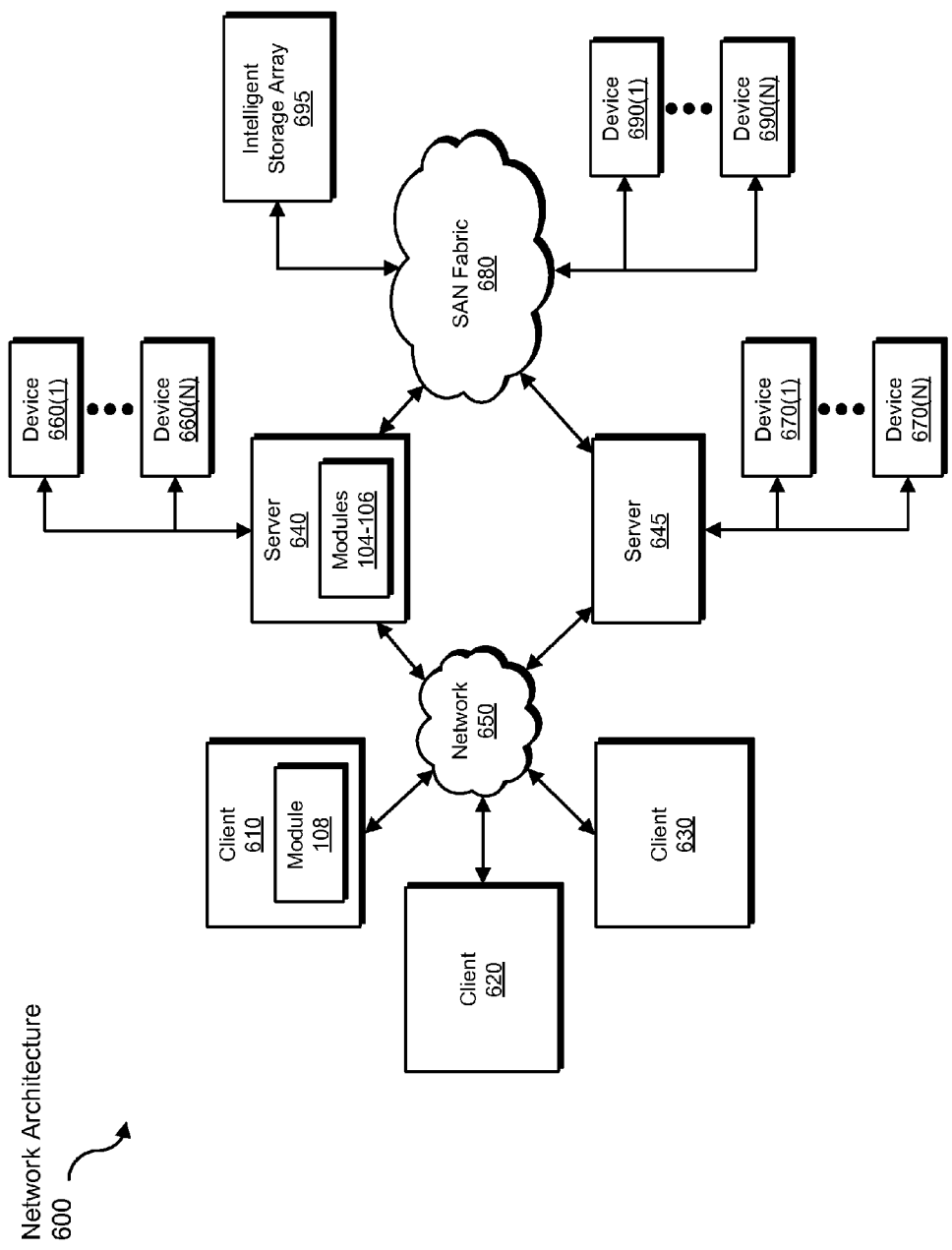
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include one or more components of system 100 from FIG. 1. As shown, server 640 may include modules 104 and 106.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, determining, tracking, caching, comparing, computing, maintaining, causing, invalidating, marking, removing, satisfying, retrieving, and sending steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for caching data blocks associated with frequently accessed files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 102 in FIG. 1 may transform a characteristic or property of a physical device (such as computing device 202 in FIG. 2) by caching data blocks associated with frequently accessed files in a caching mechanism to decrease the amount of time required to access such data blocks.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for caching data blocks associated with frequently accessed files, at least a portion of the method being performed by a computing device comprising at least one processor, the method comprising:
identifying a plurality of files that include one or more data blocks stored within a mass storage device;
prior to beginning to track the number of times that the data blocks included in the plurality of files are accessed within the mass storage device, determining that a file within the plurality of files has been accessed more frequently than one or more other files within the plurality of files by tracking the number of times that the file is accessed in the mass storage device, tracking the number of times that the other files are accessed in the mass storage device, and comparing the number of times that the file has been accessed in the mass storage device with the number of times that the other files have been accessed in the mass storage device;

in response to determining that the file has been accessed more frequently than the other files, beginning to track the number of times that at least one data block associated with the file is accessed in the mass storage device;

determining that the number of times that the data block associated with the file has been accessed in the mass storage device is above a predetermined threshold;

caching the data block associated with the file in a caching mechanism to decrease the amount of time required to access the data block.

2. The computer-implemented method of claim 1, wherein determining that the file has been accessed more frequently than the other files stored within the mass storage device comprises:

identifying a request to access the file;

identifying an indicator provided with the request that indicates that the file has been accessed more frequently than the other files stored within the mass storage device, wherein the indicator prompts tracking access to the data block associated with the file to begin.

3. The computer-implemented method of claim 1, wherein determining that the file has been accessed more frequently than the other files stored within the mass storage device comprises classifying the file as a frequently accessed file upon determining that the file has been accessed more frequently than a particular percentage of the plurality of files stored within the mass storage device.

4. The computer-implemented method of claim 1, wherein tracking the number of times that the file and the other files are accessed in the mass storage device comprises:

tracking the number of read operations performed on the file and the other files in the mass storage device;

tracking the number of write operations performed on the file and the other files in the mass storage device.

5. The computer-implemented method of claim 4, wherein comparing the number of times that the file has been accessed in the mass storage device with the number of times that the other files have been accessed in the mass storage device comprises:

computing a read-write ratio for the file based on the number of read and write operations performed on the file in the mass storage device;

computing other read-write ratios for the other files based on the number of read and write operations performed on the other files in the mass storage device;

comparing the read-write ratio for the file with the other read-write ratios for the other files;

determining, based on the comparison, that the read-write ratio for the file is higher than the other read-write ratios for the other files.

6. The computer-implemented method of claim 1, wherein tracking the number of times that the file and the other files are accessed in the mass storage device comprises:

maintaining, within an inode associated with the file, a counter that tracks the number of times that the file is accessed in the mass storage device;

maintaining, within other inodes associated with the other files, other counters that track the number of times that the other files are accessed in the mass storage device.

7. The computer-implemented method of claim 1, further comprising:

identifying a request initiated by a file system to perform a write operation on the file;

determining that the write operation is configured to modify the data block associated with the file;

identifying an indicator provided with the request that indicates whether the data block associated with the file has been cached in the caching mechanism;

satisfying the request, at least in part, by:

causing the write operation to be performed on the at least one data block stored in the mass storage device;

invalidating the data block cached in the caching mechanism to ensure that read operations are performed only on the modified data block stored in the mass storage device.

8. The computer-implemented method of claim 7, wherein invalidating the data block cached in the caching mechanism comprises at least one of:

marking the data block cached in the caching mechanism to be replaced by another data block;

removing the data block associated with the file from the caching mechanism.

9. The computer-implemented method of claim 7, further comprising, prior to identifying the request to perform the write operation on the file:

sending a notification to the file system to prompt the file system to provide, with requests to perform a write operation on the file, an indicator that indicates that the data block associated with the file has been cached in the caching mechanism.

10. The computer-implemented method of claim 1, further comprising:

identifying a request initiated by a file system to perform a write operation on another file;

identifying an indicator provided with the request that indicates that no data block associated with the other file has been cached in the caching mechanism;

satisfying the request, at least in part, by causing the write operation to be performed on the at least one data block stored in the mass storage device without attempting to invalidate any data blocks cached in the caching mechanism.

11. The computer-implemented method of claim 1, further comprising:

identifying a request initiated by a file system to perform a read operation on the file;

identifying an indicator provided with the request that indicates that the data block associated with the file has been cached in the caching mechanism;

satisfying the request, at least in part, by retrieving the data block associated with the file from the caching mechanism.

12. The computer-implemented method of claim 11, further comprising, prior to identifying the request to perform the read operation on the file:

sending a notification to the file system to prompt the file system to provide, with requests to perform a read operation on the file, an indicator that indicates that the data block associated with the file has been cached in the caching mechanism.

13. The computer-implemented method of claim 1, wherein determining that the file within the plurality of files has been accessed more frequently than the other files prior to beginning to track the number of times that the data blocks included in the plurality of files are accessed is performed such that an amount of processing time needed to update read-write statistics for frequently accessed data blocks is decreased.

14. The computer-implemented method of claim 1, wherein determining that the number of times that the data block associated with the file has been accessed in the mass storage device is above a predetermined threshold comprises determining that the number of read operations performed on the data block associated with the file is above a predetermined threshold.

15. The computer-implemented method of claim 1, wherein beginning to track the number of times that the data block associated with the file is accessed in the mass storage device comprises maintaining, within a data structure associated with the data block, a counter that tracks the number of times that the data block is accessed in the mass storage device.

16. The computer-implemented method of claim 1, wherein the caching mechanism comprises a solid-state drive.

17. The computer-implemented method of claim 1, wherein the mass storage device comprises a hard disk drive.

18. The computer-implemented method of claim 1, wherein:
  determining that the file has been accessed more frequently than the other files comprises initiating a first tracking process that includes:
    tracking the number of times that the file is accessed in the mass storage device;
    tracking the number of times that the other files are accessed in the mass storage device;
  beginning to track the number of times that the data block associated with the file is accessed in the mass storage device comprises:
    in response to determining that the file has been accessed more frequently than the other files, initiating a second tracking process that includes tracking the number of times that the data block associated with the file is accessed in the mass storage device.

19. A system for caching data blocks associated with frequently accessed files, the system comprising:
  at least one processor;
  an identification module programmed to direct the processor to identify a plurality of files that include one or more data blocks stored within a mass storage device;
  a tracking module programmed to direct the processor to:
    determine, prior to beginning to track the number of times that the data blocks included in the plurality of files are accessed within the mass storage device, that a file within the plurality of files has been accessed more frequently than one or more other files within the plurality of files by tracking the number of times that the file is accessed in the mass storage device, tracking the number of times that the other files are accessed in the mass storage device, and comparing the number of times that the file has been accessed in the mass storage device with the number of times that the other files have been accessed in the mass storage device;
    in response to the determination that the file has been accessed more frequently than the other files, begin to track the number of times that at least one data block associated with the file is accessed in the mass storage device;
    determine that the number of times that the data block associated with the file has been accessed in the mass storage device is above a predetermined threshold;
  a caching module programmed to direct the processor to cache the data block associated with the file in a caching mechanism to decrease the amount of time required to access the data block.

20. A non-transitory computer-readable-storage medium comprising one or more computer-executable instructions that, when executed by at least one processor of a computing device, cause the computing device to:
  identify a plurality of files that include one or more data blocks stored within a mass storage device;
  determine, prior to beginning to track the number of times that the data blocks included in the plurality of files are accessed within the mass storage device, that a file within the plurality of files has been accessed more frequently than one or more other files within the plurality of files by tracking the number of times that the file is accessed in the mass storage device, tracking the number of times that the other files are accessed in the mass storage device, and comparing the number of times that the file has been accessed in the mass storage device with the number of times that the other files have been accessed in the mass storage device;
  in response to the determination that the file has been accessed more frequently than the other files, begin to track the number of times that at least one data block associated with the file is accessed in the mass storage device;
  determine that the number of times that the data block associated with the file has been accessed in the mass storage device is above a predetermined threshold;
  cache the data block associated with the file in a caching mechanism to decrease the amount of time required to access the data block.

* * * * *